United States Patent
Rihn et al.

(10) Patent No.: US 10,116,614 B1
(45) Date of Patent: Oct. 30, 2018

(54) DETECTION OF ABUSIVE USER ACCOUNTS IN SOCIAL NETWORKS

(71) Applicant: Trend Micro Incorporated, Tokyo (JP)

(72) Inventors: Jennifer Rihn, Mountain View, CA (US); Jonathan James Oliver, Kew (AU)

(73) Assignee: Trend Micro Incorporated, Tokyo (JP)

(*) Notice: Subject to any disclaimer, the term of this patent is extended or adjusted under 35 U.S.C. 154(b) by 265 days.

(21) Appl. No.: 14/958,452

(22) Filed: Dec. 3, 2015

(51) Int. Cl.
*G06F 15/16* (2006.01)
*H04L 12/58* (2006.01)

(52) U.S. Cl.
CPC .................................. *H04L 51/32* (2013.01)

(58) Field of Classification Search
CPC ..................................................... H04L 51/32
USPC ........................................................ 709/206
See application file for complete search history.

(56) References Cited

U.S. PATENT DOCUMENTS

| | | | | |
|---|---|---|---|---|
| 8,564,721 B1* | 10/2013 | Berry | ................ | H04N 21/4307 348/425.4 |
| 9,043,417 B1 | 5/2015 | Jones et al. | | |
| 2009/0276771 A1* | 11/2009 | Nickolov | .............. | G06F 9/4856 717/177 |
| 2010/0158395 A1* | 6/2010 | Sathish | .................. | G06K 9/342 382/224 |
| 2014/0172989 A1* | 6/2014 | Rubinstein | .............. | H04L 51/32 709/206 |

FOREIGN PATENT DOCUMENTS

WO  2013/140410 A1  9/2013

OTHER PUBLICATIONS

Ibotta Terms of Use (Dec. 29, 2012) pp. 2/7.*
Jonathan Oliver, et al. "An in-dept analysis of abuse on Twitter", Sep. 29, 2015, 2 sheets, retrieved from the internet: https://www.virusbtn.com/conference/vb2014/abstracts/OliverKePajaresChenXiang.xml.
Xianghan Zheng, et al. "Detecting Spammers on Social Networks", Jul. 2, 2015, pp. 27-34, vol. 159 Neurocomputing, retrieved from the internet: http://www.sciencedirect.com/science/article/pii/S0925231215002106.
Kyumin Lee, et al. "Uncovering Social Spammers: Social Honeypots + Machine Learning", 2010, 8 sheets, International ACM SIGIR Conference on Research and Development, retrieved from the internet: http://faculty.cse.tamu.edu/caverlee/pubs/lee10sigir.pdf.

(Continued)

*Primary Examiner* — Oleg Survillo
*Assistant Examiner* — Tan Doan
(74) *Attorney, Agent, or Firm* — Okamoto & Benedicto LLP

(57) ABSTRACT

Abusive user accounts in a social network are identified from social network data. The social network data are processed to compare postings of the user accounts to identify a group of abusive user accounts. User accounts in the group of abusive user accounts are identified based on posted message content, images included in the messages, and/or posting times. Abusive user accounts can be canceled, suspended, or rate-limited.

4 Claims, 4 Drawing Sheets

(56) References Cited

OTHER PUBLICATIONS

Fabricio Benevenuto, et al. "Detecting Spammers on Twitter", Jul. 2010, 9 sheets, Seventh annual collaboration, Electronic messaging, AntiAbuse and Spam Conference, retrieved from the internet: http://www.decom.ufop.br/fabricio/download/ceas10.pdf.

Chris Grier, et al. "@spam: The Underground on 140 Characters or Less", Oct. 2010, 11 sheets, Proceedings of the 17th ACM Conference on Computer and Communications Security, retrieved from the internet: http://www.icir.org/vern/papers/ccs2010-twitter-spam.pdf.

Cheng Cao, et al. "Detecting Spam URLs in Social Media via Behavioral Analysis", 2015, pp. 703-714, retrieved from the internet: http://faculty.cse.tamu.edu/caverlee/pubs/cao15ecir.pdf.

Gianluca Stringhini, et al. "Detecting Spammers on Social Networks", Dec. 2010, 9 sheets, retrieved from the internet: https://www.cs.ucsb.edu/~chris/research/doc/acsac10_snspam.pdf.

Michael Fire, et al. "Strangers Intrusion Detection—Detecting Spammers and Fake Profiles in Social Networks Based on Topology Anomalies", 2012, pp. 26-39, retrieved from the internet: http://ojs.scienceengineering.org/index.php/human/article/viewFile/28/4.

Manuel Egele, et al. "COMPA: Detecting Compromised Accounts on Social Networks", 2013, 17 sheets, ISOC Network and Distributed System Security Symposium (NDSS), retrieved from the internet: http://cs.ucsb.edu/~gianluca/papers/thjp-ndss13.pdf.

Paul Pajares "Does the Twitter Follower Scam Actually Work?", Jan. 2014, 3 sheets, TrendLabs Security Intelligence Blog, retrieved from the internet: http://blog.trendmicro.com/trendlabs-security-intelligence/does-the-twitter-follower-scam-actually-work/.

Forbes—Domo CEO Josh James: Why I Pay for Twitter Followers, Jan. 2013, 6 sheets, retrieved from the internet: http://www.forbes.com/sites/victoriabarret/2013/01/11/domo-ceo-josh-james-why-i-pay-for-twitter-followers/.

Clique problem—from Wikipedia, the free encyclopedia, 9 sheets [retrieved on Nov. 13, 2015], retrieved from the internet: https://en.wikipedia.org/wiki/Clique_problem.

\* cited by examiner

DETECTION OF ABUSIVE USER ACCOUNTS IN SOCIAL NETWORKS

BACKGROUND OF THE INVENTION

1. Field of the Invention

The present invention relates generally to computer security, and more particularly but not exclusively to methods and systems for detecting user account abuse in social networks.

2. Description of the Background Art

A social networking service provides users a platform for building social networks or social relations over a public computer network, such as the Internet. Examples of popular social networking services on the Internet include the FACEBOOK, REDDIT, LINKEDIN, and TWITTER social networking services. A common problem among social networking services is spam messages, i.e., unsolicited messages that are indiscriminately sent to many users. While spamming also plagues email systems, spamming is even more of a problem in social networks because users are more trusting of messages received in their social networks. Various approaches have been suggested to combat spamming including blacklisting, statistical and machine learning, behavioral analysis, honeypots, network analysis, and anomaly detection. While these and other approaches are workable, they have limitations that make them ineffective or relatively difficult to implement on social networks. Furthermore, these approaches do not particularly address the issue of abusive user accounts, i.e., user accounts that are in violation of the terms of service (TOS) of the social networking service.

SUMMARY

In one embodiment, abusive user accounts in a social network are identified from social network data. The social network data are processed to compare postings of the user accounts to identify a group of abusive user accounts. User accounts in the group of abusive user accounts may be identified based on posted message contents, images includes in the messages, and/or posting times. Abusive user accounts may be canceled, suspended, or rate-limited.

These and other features of the present invention will be readily apparent to persons of ordinary skill in the art upon reading the entirety of this disclosure, which includes the accompanying drawings and claims.

Figure 1:
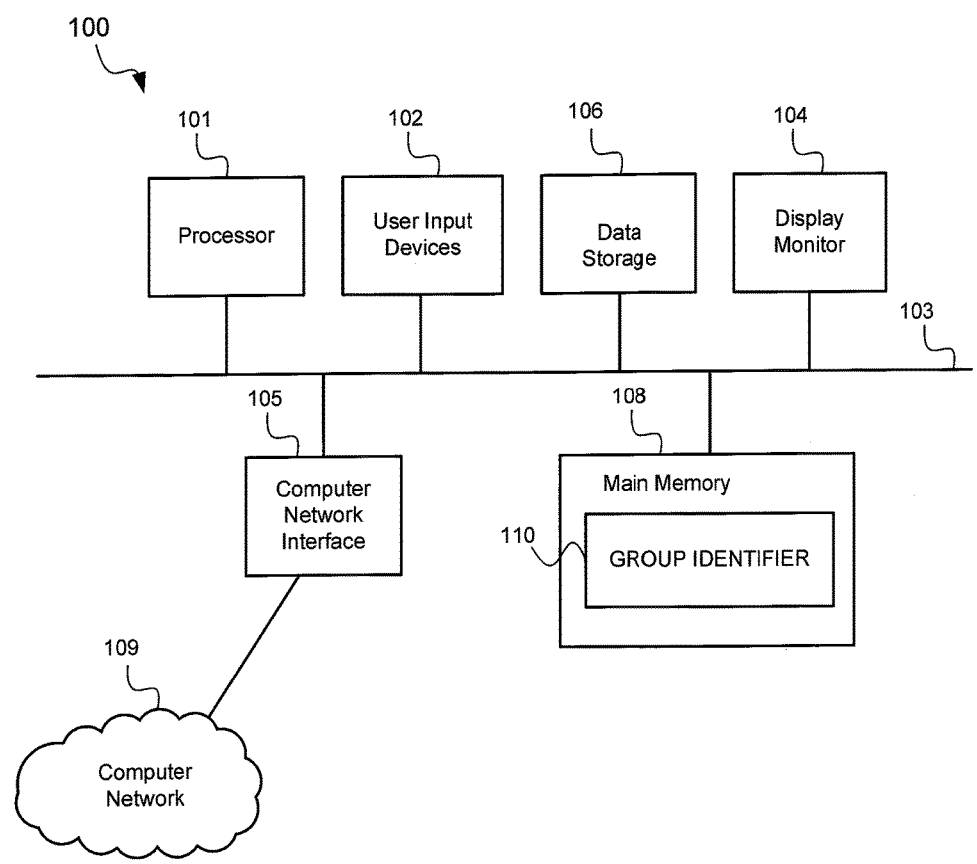
FIG. 1 shows a schematic diagram of a computer system in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Various approaches have been suggested to combat spamming in general. Statistical and machine learning allows for creation of a model using features obtained from sample message content and/or user account characteristics. The model can then be used to identity compromised user accounts. A problem with machine learning is that it requires detailed access to user accounts being evaluated, access which may only be available to the social networking service.

A blacklist must be kept up-to-date, which becomes increasingly difficult as new threats emerge at a rapid rate. Furthermore, the prevalence of shortened uniform resource locators (URLs), rapidly changing spam infrastructure (e.g., new domain names and Internet Protocol (IP) addresses), and avoidance techniques make blacklisting somewhat ineffective.

Behavioral analysis can detect spamming based on behavior of user accounts that post or click on a URL. However, this approach requires metrics about URLs, which are not generally available for URLs, shortened or otherwise.

Honeypot accounts can be setup in a social network to allow for monitoring of user activities for extensive periods of time. A problem with honeypots is that spam messages in a social network often go from a user (who could be compromised) to that user's friends and followers, etc. Thus, the honeypot accounts will not receive the majority of spam messages. Honeypot accounts also do not work on spam messages that require the user to perform a specific action, such as in cases where the user has to install a particular app.

Network analysis allows for creation of a directed graph that can be used to represent the relationship between users in a social network. Machine learning techniques can then be used to distinguish between legitimate users and abusive users. Unfortunately, network analysis cannot easily distinguish between legitimate and abusive users, such as when legitimate users hire or pay followers.

Anomaly detection enables identification of user accounts that exhibit a sudden change in behavior and other behavior that may be considered an anomaly. Anomaly detection has similar limitations to statistical and machine learning approaches. More particularly, collecting user account profiles for processing may be impossible or very difficult except for the social networking service. More particularly, if a third-party computer security company or user attempts to query user accounts to identify abusive user accounts, then it is very likely that the third-party will get blacklisted by the social networking service.

An issue that is not adequately addressed by existing anti-spam approaches is that a social networking service may actually allow certain users to send spam messages. For example, some social networking services allow a user to sign-up for a business account, which allows the user to send unsolicited and likely unwanted messages to other users. Although these messages from business accounts are, technically-speaking, spam messages, they are within the terms of service (TOS) of the social networking service and are thus not abusive. Some anti-spam approaches may nevertheless block these messages even though theirs senders pay the social networking service for the privilege.

Referring now to FIG. 1, there is shown a schematic diagram of a computer system 100 in accordance with an embodiment of the present invention. The computer system 100 may be employed as a third-party account analysis system, a social network system, or other computer systems described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101. An article of manufacture may be embodied as computer-readable storage medium including instructions that when executed by the processor 101 of the computer system 100 causes the computer system 100 to be operable to perform the functions of the one or more software modules. In the example of FIG. 1, the software modules comprise a group identifier 110. In one embodiment, the group identifier 110 is configured to identify a group of user accounts that are in violation of the TOS of a social networking service.

For example, the group identifier 110 may receive social network data, filter the social network data to generate filtered social network data, and process the filtered social network data to compare posting activities of user accounts to identify user accounts that behave in a coordinated manner. The user accounts may be coordinated to participate in the same spamming campaign, which involves posting the same or similar spam messages on the social network. These coordinated user accounts are typically owned by the same user, which may be in violation of the TOS of the social networking service. More particularly, the TOS may prohibit a single user from having multiple accounts, which are also referred to as "serial accounts".

Figure 2:
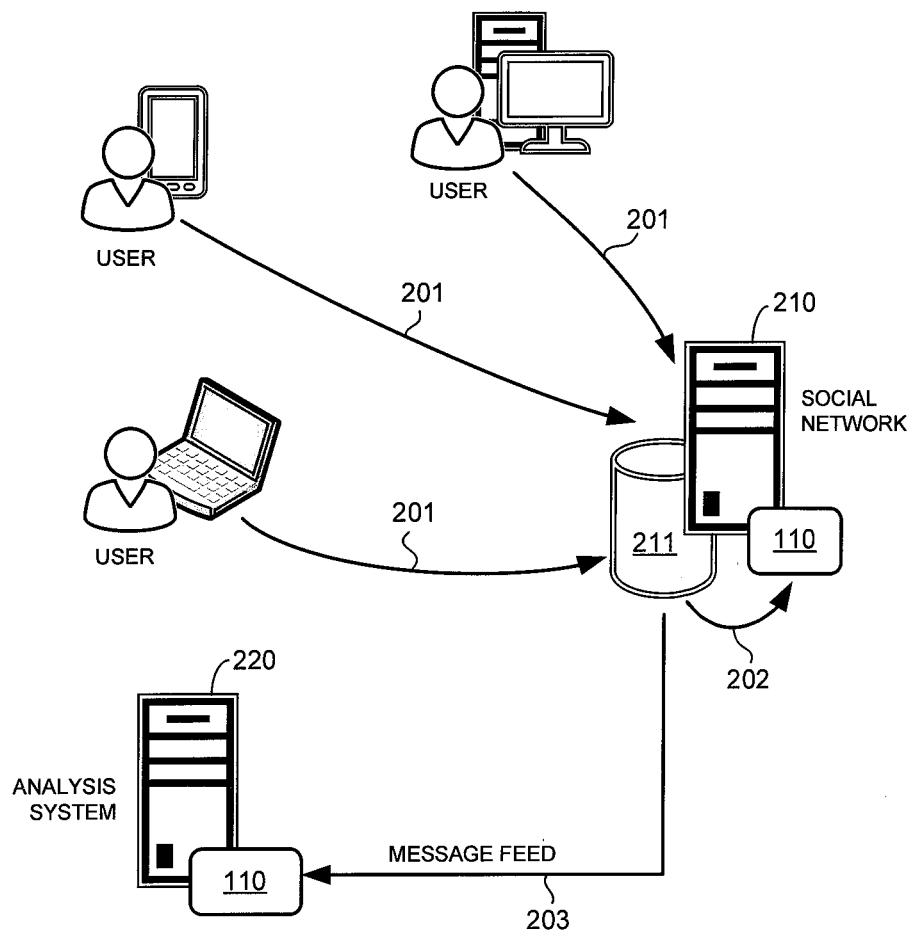
FIG. 2 shows a schematic diagram of a system for identifying abusive user accounts in social networks in accordance with an embodiment of the present invention.

FIG. 2 shows a schematic diagram of a system for identifying abusive user accounts in social networks in accordance with an embodiment of the present invention. The system for identifying abusive user accounts may include one or more computers that run a group identifier 110. In the example of FIG. 2, a group identifier 110 may be hosted by a social network system 210 and/or a third-party account analysis system 220. The components of the system of FIG. 2 may communicate over the Internet.

In the example of FIG. 2, the social network system 210 may comprise one or more computers for providing a social network for a plurality of users. The social network system 210 may be that of the TWITTER or other social networking service. A user may participate in the social network using his or her user computer (see arrows 201). Social network data may be stored in a data store 211 of the social network system 210. In one embodiment, the social network data may include the contents of posted messages (e.g., text and images), message metadata (e.g., posting times), and user account information.

A user may create a user account with the social networking service to participate in the social network. To create the account, the user has to agree to abide by the TOS of the social networking service. The TOS may particularly prohibit a single user from creating serial accounts. A user account that violates the TOS is deemed to be an abusive user account. Abusive user accounts may be deleted, suspended, rate-limited, or be subjected to other punishment by the social networking service. The social network system 210 may host a group identifier 110 to process social network data to identify abusive user accounts (see arrow 202). This allows the social networking service itself to police its user base.

In the example of FIG. 2, the third-party account analysis system 220 may comprise one or more computers for identifying abusive user accounts in a social network. The analysis system 220 is a "third-party" in that it is not affiliated with the social networking service. Instead, the account analysis system 220 is operated by an entity that is separate from the social networking service and that provides a security service to the social networking service. For example, the account analysis system 220 may be operated by a computer security company, such as Trend Micro, Inc.

In the example of FIG. 2, the account analysis system 220 is not part of the infrastructure of the social networking service. More particularly, in the example of FIG. 2, the account analysis system 220 receives social network data from the social network system 210 over the Internet by way of a message feed (see arrow 203). The message feed may comprise a streaming feed from the social network system 210 and may be accessible by way of application programming interfaces (APIs) provided by the social networking service. The account analysis system 220 may include a group identifier 110 for processing received social network data to identify abusive user accounts. In one embodiment, the account analysis system 220 may process the social network data to identify a group of user accounts that belong to the same user in violation of the TOS of the social networking service.

Figure 3:
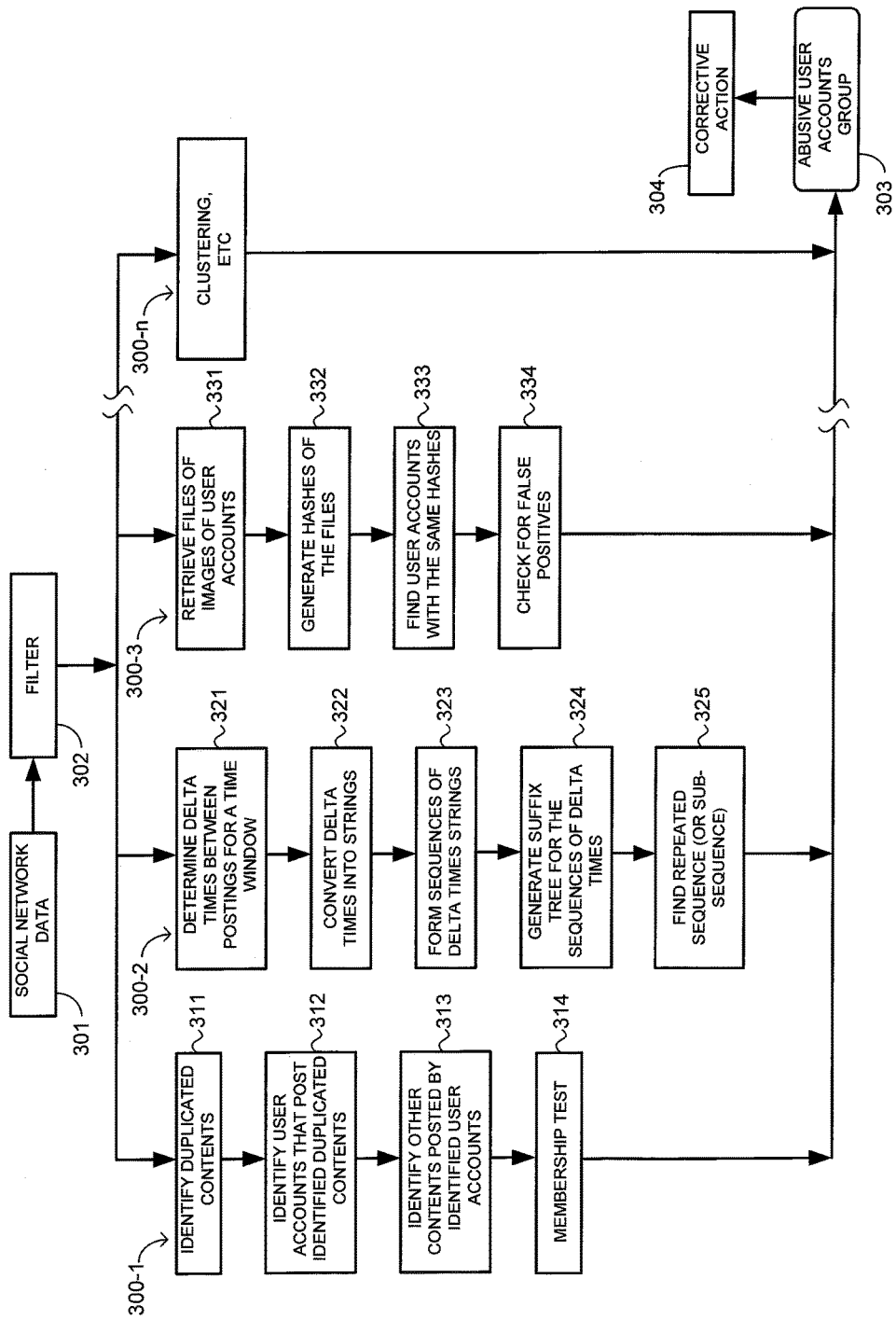
FIG. 3 shows a flow diagram of a method of identifying abusive user accounts in social networks in accordance with an embodiment of the present invention.

FIG. 3 shows a flow diagram of a method of identifying abusive user accounts in social networks in accordance with an embodiment of the present invention. In the example of FIG. 3, the abusive user accounts are part of a group of user accounts that cooperate to post messages in violation of the TOS of the social networking service that provides the social network. The method of FIG. 3 may be performed by the social network system (FIG. 2, 210) of the social networking service or by a third-party account analysis system (FIG. 2, 220). In one embodiment, the method of FIG. 3 is performed by a third-party account analysis system to process tweet messages, i.e. messages posted on the TWITTER social network. Other systems may also perform the method of FIG. 3 to process messages of other social networks without detracting from the merits of the present invention.

In the example of FIG. 3, social network data of the social network are received for processing (step 301). The social network data may be received directly from a data store (FIG. 2, 211) in the embodiment where the social network data are processed by a social network system of the social network service. The social network data may be received from a message feed in the embodiment where the social network data are processed by a third-party account analysis system. In that embodiment, the third-party account analysis system may receive the social network data over the Internet using APIs provided by the social networking service.

Optionally, the received social network data may be filtered to reduce the amount of data to be processed (step 302). The filtering step removes user accounts that are very unlikely to be abusive, with the remaining, filtered user accounts being more likely to be abusive. The filtering step may be implemented using machine learning techniques, such as support vector machine (SVM), for example. The features for training the machine learning model may be those that identify automatically-created accounts as opposed to those created by individuals. Examples of features that may be used to train a machine learning model to perform the filtering step include: (a) identical messages and other user-generated content; (b) language of the messages, and discrepancies in the case of multiple languages; (c) where the message was sent from; (d) presence of specific phrases that are indicative of spam in messages; (e) message length and standard deviation of message length; (f) number of followers, friends, likes, photos; (g) ratios of various parameters, such as total number of messages to the total number of followers; (h) changes in number of followers, friends, likes, photos; (i) the total number of messages generated; (j) account creation date; (k) number of periods of days the messages are posted; (l) times that messages are generated; (m) delta times between postings of messages; (n) mean emission rate of messages since account creation; (o) number of URLs in messages; (p) number and average of hash tags and handles in user-generated messages; etc.

After the optional filtering step, the remaining social network data may be processed using one or more procedures 300 (i.e., 300-1, 300-2, 300-3, . . . , 300-n) to identify a group of user accounts that coordinate to post messages, such as a group of user accounts that participate in a same spamming campaign to post the same or similar spam messages on the social network. Because such a group of user accounts are most likely created by the same user, the user accounts that belong to the group may be deemed to be abusive user accounts. More particularly, the user accounts in the identified group are most likely serial accounts, i.e., multiple user accounts created by the same user in violation of the TOS of the social networking service.

As can be appreciated, a user's persona in a social network is that user's account. That is, in the context of a social network on the Internet, a user is referred to by his or her user account. Although messages may be posted by different user accounts, the messages may or may not be from the same user. In the example of FIG. 3, a procedure 300 may compare messages posted by different user accounts and associated metadata (e.g., posting times) to identify a group of different user accounts of the same user. For example, a procedure 300 may compare images in messages posted by the user accounts, delta time between postings of the user accounts, contents (e.g., URLs or text) in messages posted by the user accounts, etc.

In the example of FIG. 3, a procedure 300-1 comprises steps 311-314. In one embodiment, the procedure 300-1 creates an approximate bipartite clique graph to identify a group of abusive user accounts. Looking for approximate bipartite cliques, as opposed to complete bipartite cliques, in the social network data provides several advantages. First, finding an approximate bipartite clique involves less processing compared to finding a complete clique. Second, in a filtering step that includes machine learning classification, the filtering step may have filtered out some social network data that may be part of a complete clique.

Generally, in one embodiment, an approximate bipartite clique may be identified from the social network data by selecting two types of nodes (or vertices). For example, one type of nodes may represent user accounts, and another type of nodes may represent message contents that are typically duplicated (or very similar) across abusive user accounts. For example, the message content may be URLs, because a group of abusive user accounts typically post duplicated or very similar URLs. Another example of content repeated across multiple accounts may be words in a message. In some cases, a combination of complete URLs and just the domain may be used for the nodes. However, using just the domain may not work for shortened URLs (e.g., bit.ly) or for very common domains, such as «youtube.com».

After the two types of nodes are selected, the procedure 300-1 may be initiated by looking for content duplicated across multiple accounts (step 311). Content may be deemed to be duplicated if the same content appears more than a predetermined minimum number of times in different messages. Each user account that posted the duplicated content is then identified (step 312) to generate a set of identified user accounts. Other contents posted by those user accounts in the identified set of user accounts are found (step 313). A membership test is then performed on the set of identified user accounts (i.e., user accounts that posted the duplicated content) and the set of contents that includes the duplicated contents and other contents posted by user accounts in the set of identified user accounts (step 314). A frequency threshold may be used for the membership test. If a frequency threshold is used, the membership test eliminates user accounts in the set of user accounts and contents in the set of contents that do not meet a threshold. More particularly, the membership test may include checks to ensure that the number of user accounts in the set of identified user accounts and the number of contents in the set of contents in the approximate clique are sufficiently large. For example, user accounts and contents that do not occur more than a predetermined minimum number of times may be removed from consideration. The remaining user accounts may be deemed to be members of a group of abusive user accounts.

Figure 4:
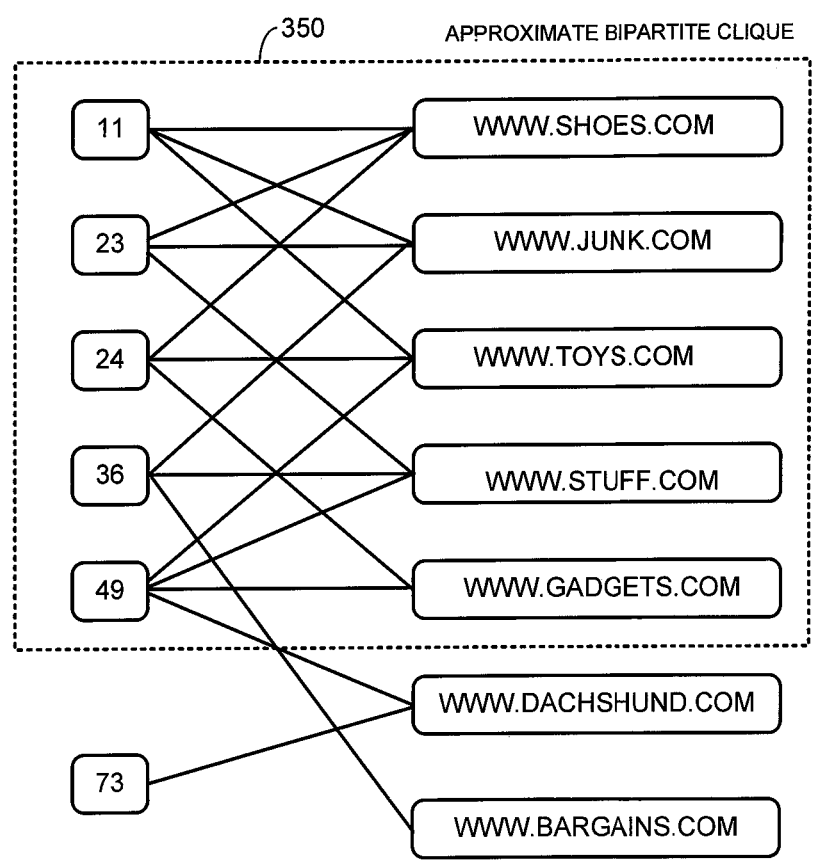
FIG. 4 shows an example operation of a procedure for identifying abusive user accounts in accordance with an embodiment of the present invention.

FIG. 4 shows an example operation of the procedure 300-1 in accordance with an embodiment of the present invention. In the example of FIG. 4, one type of nodes of the bipartite clique comprises user accounts and the other type of nodes of the bipartite clique comprises URLs. In the example of FIG. 4, nodes labeled as 11, 23, 24, 36, 49, and 73 each represents a user account; the other type of nodes comprises the URLs «www.shoes.com», «www.junk.com», «www.toys.com», «www.stuff.com», «www.gadgets.com», «www.dachshund.com», and «bargains.com».

In the example of FIG. 4, the procedure 300-1 is initiated by looking for duplicated URLs i.e., a URL that has been posted at least N times (step 311 in FIG. 3). In the example of FIG. 4, the URLs «www.shoes.com», «www.junk.com», «www.toys.com», «www.stuff.com», «www.gadgets.com», and «www.dachshund.com» all have been found in more than N number of different messages. The URL «www.bargains.com» has not been found in enough number of different messages. In some embodiments, a URL and variants of the URL are deemed to be the same URL for purposes of looking for duplicated URLs. For example, «www.shoes.com/xyz/1», «www.shoes.com/xyz/2», and «www.shoes.com/xyz/3» may be deemed to be the same URLs.

User accounts that posted duplicate URLs are then identified (step 312 in FIG. 3). In the example of FIG. 4, the user accounts 11, 23, 24, 36, 49, and 73 are identified as having posted one or more messages that include at least one of the URLs «www.shoes.com», «www.junk.com», «www.toys.com», «www.stuff.com», «www.gadgets.com», and «www.dachshund.com». For example, the user account 11 has posted one or more messages that include the URLs «www.shoes.com», «www.junk.com», and «www.toys.com». Similarly, the user account 73 has posted one or more messages that include the URL «www.dachshund.com».

For each user account that has posted a URL, domain, or other content that was duplicated over the group of user accounts, other content of the desired type posted by the user account is identified (step 313 in FIG. 3). In the example of FIG. 4, the user account 36, which has been identified as having posted one or more messages that include the duplicated URLs «www.stuff.com» and «www.junk.com», is found to have posted one or more messages that include the URL «www.bargains.com». The URL «www.bargains.com» is thus considered for addition to the bipartite clique.

A membership test is performed on the set of identified user accounts and the set of identified URLs (i.e. all of the URLs shown in FIG. 4) to eliminate nodes of the approximate bipartite clique that do not occur frequently enough (step 314 in FIG. 3). In the example of FIG. 4, the URLs «www.dachshund.com» and «www.bargains.com» are not found in a sufficient number of messages, and are accordingly eliminated from the approximate bipartite clique. In the example of FIG. 4, the user account 73 has not posted a message that includes a URL included in the approximate bipartite clique (because the URL «www.dachshund.com» has been eliminated from the approximate bipartite clique) and is thus eliminated from the approximate bipartite clique. The resulting bipartite clique 350 identifies a group of abusive user accounts that includes user accounts 11, 23, 24, 36, and 49 (block 303 in FIG. 3).

The possibility that two types of nodes in an approximate bipartite clique result by chance may be considered as follows. Although other assumptions could be made in determining probabilities, possible probability calculations are presented here. Again, for ease of discussion, the two types of nodes in the following example will be user accounts and URLs in messages posted by user accounts. Suppose that the universe of possible URLs is Nurls, user account A randomly selects m URLs out of the universe of Nurls, and user account B also randomly selects m URLs out of the universe of Nurls. For the two user accounts A and B, binomial distribution may approximate the probability that r or more of the URLs selected by the user account B are in common with those selected by the user account A:

$$P = \sum_{i=r}^{m} \binom{m}{i} p^i (1-p)^{m-i} \quad \text{(EQ. 1)}$$

where p=m/Nurls. It is to be noted that the probability P of EQ. 1 assumes that each URL is equally likely to be selected, which is not necessarily true. However, because Nurls may be on the order of millions and m<<Nurls, the probability P will be very small, indicating that two user accounts A and B are not likely to post messages that include the same URL. If the number of user accounts that select r or more the same URLs is increased to more than two, then the probability P will decrease even further.

Referring back to FIG. 3, after the optional filtering step, the remaining social network data may be processed using a procedure 300-2 to identify a group of abusive user accounts. In the example of FIG. 3, the procedure 300-2 comprises steps 321-325. In one embodiment, the procedure 300-2 identifies a group of abusive user accounts by building a suffix tree that is based on posting times, i.e., when messages are posted.

In the example of FIG. 3, the procedure 300-2 is initiated by determining the delta between posting times of a particular user account for a given time window (step 321). That is, for each user account being evaluated for the given time window, the time difference between postings of the user account is determined. This results in each user account having a sequence of delta times. For example, a user account D may have posting delta times of 14, 31, 20, and 19 (minutes, or other unit of time), indicating that the user account D posted a message 14 minutes after a previous message, then posted another message 31 minutes later, then posted another message 20 minutes later, and then posted another message 19 minutes later. The delta times of each user account are thereafter converted into a sequence of delta times string (step 322). In the just mentioned example, the delta times for the user account D may be converted into a string "_14_31_20_19". In one embodiment, only users who post more than a specified minimum of messages may be considered.

A suffix tree may be generated for the sequences of delta times strings of the user accounts being evaluated (step 324). User accounts that have the same sequence (or sub-sequence) of delta times may be deemed to belong to the same abusive user group (step 325). The length of the repeated sequence of delta times for inclusion into the group may be varied depending on the social network. The suffix tree facilitates finding the user accounts with the same sequence of delta times. These user accounts are deemed to belong to the same group of abusive user accounts (block 303).

For example, suppose user accounts had the following sequences of delta times between messages:
User 9: _23_6_73_19_43_29_5_16
User 27: _19_43_29_5_16_37
User 36: _23_6_73_19_43_29_5_16_92_14
User 49: _10_13_1_22_19_43_16_11

In the above example, user 9, user 27, and user 36 have common sub-strings—the delta-time sequence "_19_43_29_5_16"—and can thus can be considered to belong to the same abusive user. Although user 49 shares a delta time sequence of 2 delta times ("_19_43") with the other users, the length of the delta time sequence is below the threshold.

The remaining social network data after the optional filtering step may also be processed using a procedure 300-3 to identify a group of abusive user accounts. In the example of FIG. 3, the procedure 300-3 comprises steps 331-334. In one embodiment, the procedure 300-3 identifies a group of abusive user accounts based on images associated with user accounts.

In the example of FIG. 3, the procedure 300-3 is initiated by retrieving files of images of user accounts (step 331). The images may be banners, images in messages, and other images associated with user accounts. A hash is generated for each image file (step 332). The hash may be an MD5 hash, for example. Different user accounts that have the same image file hash are identified (step 333). More particularly, user accounts that have the same image (e.g., same posted image or same banner) are identified as potentially belonging to the same group of abusive user accounts. The potential group of abusive user accounts is then checked for false positives, i.e., user accounts that are incorrectly identified to be abusive (step 334). It is to be noted that checking for false positives may also be performed at an earlier stage to simplify processing.

In one embodiment, checking for false positives may include: (a) using a white list of legitimate images to exclude some user accounts; (b) excluding user accounts whose content mentions news, traffic, weather, jobs, etc. and similar contents that have legitimate-use cases in some businesses in different geographical markets; and (c) requiring a group of users with identical images to have other commonalities. Some commonalities may include accounts created on the same day, duplicated posting times, duplicated URLs in posted messages, the same (self-described) user language, the same language for the message content, user accounts have the same self-described language but which is different from the content language, similar values of ratios of parameters (e.g., like number of friends to followers), and so on. User accounts with the same image and that have been checked for false positives may be deemed to be members of a group of abusive user accounts (block 303).

As can be appreciated other procedures may also be employed to identify a group of abusive user accounts. As a further example, user accounts may be clustered based on account or message characteristics. Features that may be taken into account for clustering may include: (a) language of the messages, and discrepancies if there are multiple languages; (b) presence of spammy words; (c) message length and standard deviation of message lengths; (d) number of followers, friends, likes, photos; (e) ratios of various parameters, such as total number of messages to the total number of followers; (f) changes in number of followers, friends, likes, photos; (g) total number of messages generated; (h) account creation date; (i) number of periods of day within which messages are posted; (j) times that messages are generated; (k) delta times between posting of messages; (l) mean emission rate of messages since account creation; (m) number of URLs in messages; (n) domains in URLs; and (o) numbers and averages of hash tags and handles in user-generated content.

Corrective action may be performed in response to identifying a group of abusive user accounts (step 304). For example, the social networking service may cancel or suspend the abusive user accounts. Abusive user accounts may also be rate-limited or restricted in some other way.

Given a group of user accounts that are behaving in a coordinated manner, there is always the possibility that the coordinated behavior occurs simply due to random chance. When user accounts are grouped using one set of criteria (e.g., in accordance with a procedure 300-1, 300-2, or 300-3), the probability of other user content or profile parameters for that group can be calculated. For example, given a group of user accounts with identical images, account parameters for that group of user accounts, such as account creation dates or user language, can be examined to determine the probability that identical account creation dates or user languages could have occurred by chance.

In the following example, account creation dates are assumed to have a uniform distribution for ease of calculation, although other probability distributions may be considered. If the social network has been in existence for y years, then the probability that an account is created on any given day is: $1/(y*356)$. If two user accounts are randomly selected, the probability that the two user accounts do not have the same creation day is:

$$\text{Prob(not same creation day)} = 1 - (y*365)*(y*365-1)/[(y*365)^2] \quad \text{(EQ. 2)}$$

and the probability that two user accounts were created on the same day is:

$$\text{Prob(same creation day)} = 1 - (y*365)*(y*365-1)/[(y*365)^2] \quad \text{(EQ. 3)}$$

If the social network has been in existence for 5 years, then $$\text{Prob(same creation day)} = 0.00055$$

which is relatively low. Similar calculations can be done for other parameters. For example, the probability that G user accounts in a group all have a self-described language of Turkish, but all their messages are in Korean can be calculated. To calculate this probability, the conditional probability $$P(\text{message in Korean}|\text{self-described language of Turkish})$$

over the entire data set or a significant sample of the data set would have to be determined. Then, the probability that G user accounts all have messages in Korean but with a self-described language of Turkish is:

$$P(\text{message in Korean}|\text{self-described language of Turkish})^N$$

Methods and systems for identifying abusive user accounts in a social network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying abusive user accounts in a social network, the method comprising:
   receiving social network data of a social network provided by a social networking service, the social network data including data on a plurality of user accounts of users of the social network and messages posted on the social network;
   identifying a group of user accounts from the plurality of user accounts that belong to a same user; and
   blocking the group of user accounts,
   wherein identifying the group of user accounts comprises:
      determining delta times between postings of each user account in the group of user accounts;
      converting the delta times into sequences of delta times text strings; and
      identifying the group of user accounts as user accounts in the plurality of user accounts that have a same sequence of delta times text strings.

2. The method of claim 1, wherein blocking the group of user accounts comprises canceling user accounts of the group of user accounts.

3. The method of claim 1, wherein blocking the group of user accounts comprises suspending user accounts of the group of user accounts.

4. The method of claim 1, further comprising: rate limiting or restricting user accounts of the group of user accounts.

* * * * *